Patented July 15, 1952

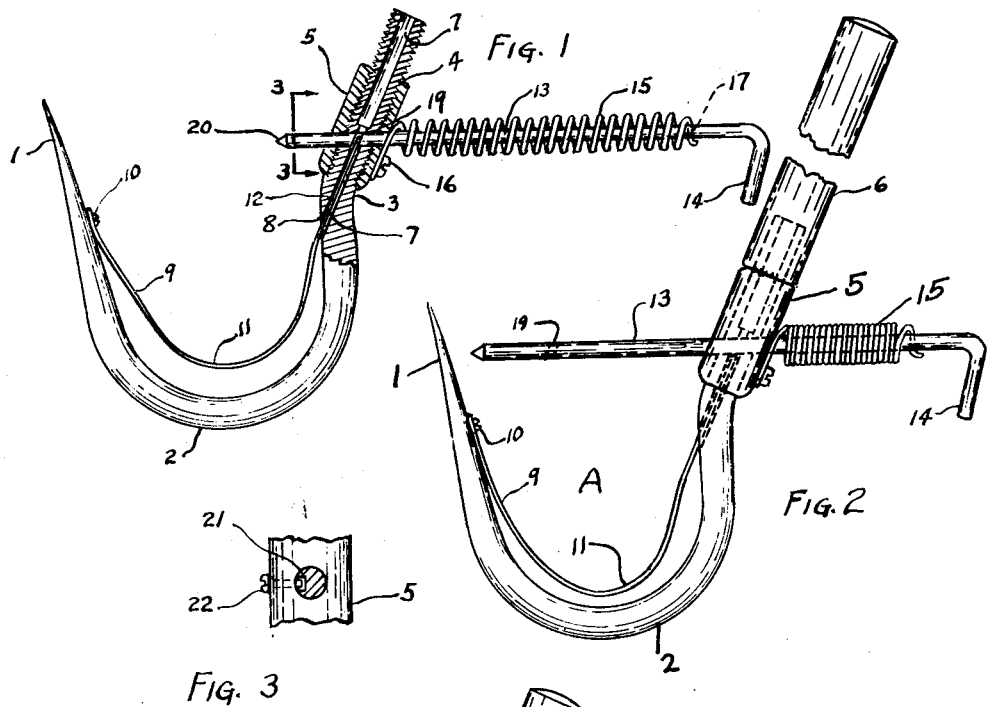
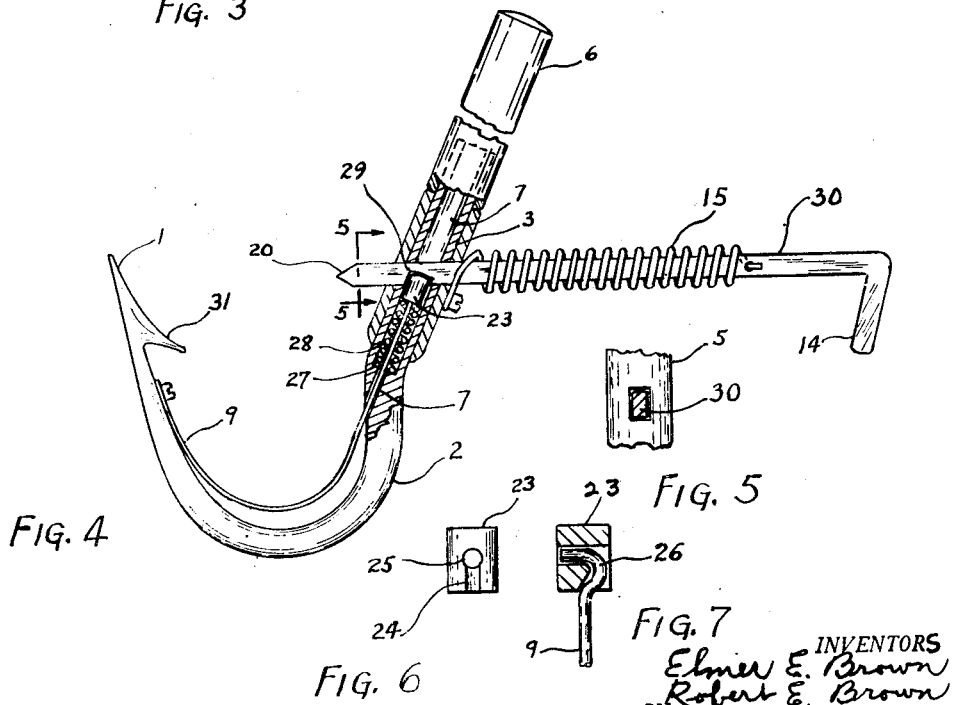

2,603,520

UNITED STATES PATENT OFFICE 2,603,520

GAFF HOOK

Elmer E. Brown, Cleveland, and Robert E. Brown, Middleburgh Heights, Ohio

Application April 8, 1950, Serial No. 154,862

10 Claims. (Cl. 294—26)

The present invention relates to gaff hooks and more particularly to a gaff hook provided with means responsive to the gaffing of a fish for actuating mechanism for retaining the fish in place on the hook.

In catching fish with an ordinary fishing rod provided with a reel, line and hook, it is the practice to gradually pull the fish alongside of a boat or dock and to utilize a hand net for landing the fish. When a comparatively large fish is caught, however, it is difficult to use an ordinary landing net and in such cases, it is the practice to utilize a gaff hook to land the fish which gaff hook is considerably larger and stronger than an ordinary fisnihg hook. In gaffing the fish, the hook is usually passed through the gills or body portion of the fish and the fish is then pulled into the boat or onto a dock by hand. The gaff hook and the small fishing hook are then removed from the fish. In attempting to gaff a fish with an ordinary gaff hook, however, it is not unusual for the fish to make a terrific lunge in which he not only frees himself from the gaff hook but also breaks the comparatively small fishing line and escapes. The escape of a large fish is particularly annoying to the ordinary fisherman because he not only loses the fish but such loss detracts from the pleasure which is ordinarily derived from the sport and subjects him to derision when he mentions the large one that got away.

It is an object of the present invention to provide an improved gaff hook in which means are provided to automatically retain the fish in place during and after the gaffing of the fish.

Another object of the invention is to provide an improved gaff hook that is simple in structure and by means of which the fish may be retained in place while being impaled upon the gaff hook.

Our invention will be better understood by reference to the accompanying drawings in which:

Fig. 1 is an elevational view with parts in section of our improved gaff hook with the retaining means shown in a locked or set position;

Fig. 2 is an elevational view of the gaff hook shown in Fig. 1 with the retaining means in its operative position and showing a handle secured to the gaff hook;

Fig. 3 is a cross sectional view on the line 3—3 of Fig. 1 showing a modification of the bar utilized in the retaining mechanism;

Fig. 4 is a view similar to Fig. 1 showing a modification of our improved gaff hook;

Fig. 5 is a cross sectional view taken on a plane passing through the line 5—5 of Fig. 4, looking in the direction of the arrows;

Fig. 6 is a detail view of the collar shown in Fig. 4; and

Fig. 7 is a cross sectional view showing the manner in which the wire is secured to the collar.

As illustrated in Figs. 1 and 2 of the drawings, the gaff hook includes a pointed impaling portion 1 formed integral with a loop 2, and a rod portion 3 which rod portion is inclined in a direction diverse to the pointed portion 1 so that a fish may be easily gaffed by a fisherman standing in a boat or on a dock.

In ordinary practice, after the fish is caught with the ordinary line and reel, the pointed portion 1 of the gaff hook is impaled through the gills or other portion of the fish and he is then pulled into the boat or landed on the dock. In accordance with the present invention, however, means are provided for retaining the fish in place and while various means may be provided for this purpose, as illustrated in Figs. 1 and 2, the rod portion 3 is threaded to receive a sleeve 5 which terminates below the free end portion 4 of the rod portion to provide threads for receiving a handle 6 which may be secured to the free end portion 4 of rod 3 beyond the sleeve 5. The handle 6 may of course be varied in length to suit the convenience of different fishermen. As shown in Figs. 1 and 2, rod portion 3 of the gaff hook is provided with a cylindrical bore 7 which may be formed in the rod in any suitable manner, such as by drilling, which bore terminates in an opening at the point 8 which is approximately the junction point of the rod portion 3 and an outwardly extending portion of the loop 2.

As shown in Figs. 1 and 2 of the drawings, a spring wire 9 has one end bent into the form of an eyelet and is secured to the pointed end 1 of the hook by suitable means, such as a set screw 10. Spring wire 9 is also provided with a central loop portion 11 which conforms substantially in shape to the loop portion of the hook and is spaced therefrom, and a substantially straight portion 12 which extends into bore 7 and is urged upwardly therein by the spring tension of the wire.

Means retained in a set position by wire 9 are provided for retaining the fish in place during and after gaffing. For this purpose, rod 3 and sleeve 5 are provided with transverse openings to receive a retaining bar 13 which may be of any desirable shape and which is provided at one end with a handle 14. As shown in Figs. 1 and 2, the bar 13 is cylindrical in shape and the transverse openings in rod 4 and sleeve 5 are round to receive the bar. If desired, however, rectangularly-shaped openings may be formed in rod 4 and sleeve 5 in which case bar 13 is also rectangular in shape as shown in Figs. 4 and 5 of the drawings to be subsequently described. Sleeve 5 is provided to reinforce rod 3 and if desired may be omitted.

Bar 13 is normally urged to the left as shown in Fig. 1 by resilient means, such as a tension spring 15 having one end secured to sleeve 5 and its opposite end secured to the bar 13 adjacent handle 14. Spring 15 may be of any desired type and may be associated with bar 13 in any suitable manner. As illustrated, spring 15 is of the coil type through which bar 13 extends and one end of spring 15 is shaped to provide an eyelet through which a set screw 16 extends for fastening it to sleeve 5 and its opposite end extends through an opening 17 in bar 13 adjacent handle 14 and is bent to prevent its removal from the bar.

To retain bar 13 in its extended position as shown in Fig. 1, it is provided with an opening 19 which extends angularly to the bar as shown in Figs. 1 and 2 so that when the bar is pulled toward the right in opposition to spring 15, opening 19 will be in alignment with bore 7 and the spring wire 9 will extend through the opening and will hold the bar 13 in the position shown in Fig. 1. When a fish is gaffed by forcing the pointed portion of the hook through the gills or other portions of the fish, however, the fish is forced into engagement with spring wire 9, thereby pulling the free end portion of the wire spring out of the opening 19 and bar 13 is forced toward the left as shown in Fig. 1 under the influence of spring 15 to the position shown in Fig. 2. It will be noted that if the head or body of the fish lies within the space A provided by the gaff hook and bar 13, the fish will be retained in place by the bar until landed. The fish, however, in his attempts to escape may throw his body in the path of bar 13 in which case the force of the bar under the influence of spring 15 may be sufficient to kill or pierce the fish and for this purpose the bar 13 is provided with a pointed end 20.

After the fish is landed and removed from the gaff hook, the hook may be again reset by pulling bar 13 to the right against the force of spring 15 until the opening 19 in bar 13 is moved in alignment with bore 7 at which time the upward tension of spring 11 forces its free end through the opening 19 and again locks the retaining means in place. Because bar 13 as shown in Figs. 1 and 2 is round, the opening 19 might not be in alignment with the bore when bar 13 is pulled toward the right. By turning the bar 13 slightly, however, opening 19 may be brought into proper alignment with the bore 7.

To avoid the necessity of turning bar 13 to position its opening 19 in alignment with the bore 7, however, the bar 13 may be provided with a groove 21 as shown in Fig. 3 of the drawing to loosely receive the shank of a set screw 22 so as to permit transverse movement of the bar 13 while preventing substantial angular movement thereof, and consequently when bar 13 is pulled toward the right to position opening 19 in alignment with bore 7, the free end of spring wire 9 will pass through the opening and retain bar 13 in its set position until the next fish is to be gaffed.

Another modification of our invention is shown in Figs. 4, 5, 6 and 7 in which most of the parts are similar to those shown in Figs. 1 and 2 and consequently have been designated by the same reference numerals. In the modifications shown in Figs. 4 to 7, a portion of bore 7 is larger in diameter than that shown in Figs. 1 and 2 and the free end portion of wire 9 is provided at its upper end with an abutment, such as a collar 23, which may be secured to the free end of the wire in any suitable manner, such as by welding or by a set screw. To facilitate the removal of the wire from the collar 23, however, or to permit the use of the gaff hook in the event that a set screw might loosen and become lost, a groove 24 terminating in an aperture 25 is formed in collar 23 as disclosed in Figs. 6 and 7 and the free end portion of the wire 9 extending into bore 7 is provided with a portion that fits in the aperture 25. The collar 23 slidably engages the wall forming bore 7 and while the collar and wire are in position within the bore, the free end of the wire will be held in place by the internal wall of rod 3 surrounding bore 7.

As illustrated in Fig. 4, the lower portion of the bore is reduced in size to form a shoulder 27 which provides a seat for one end of a coil spring 28, the other end of which abuts against the lower edge of collar 23, urging collar 23 upwardly into seating engagement with a recess 29 formed in a rectangularly-shaped bar 30 which extends through rectangularly-shaped aligned openings formed in rod 3 and sleeve 5 as shown in Fig. 5. The coil spring 28 also serves to retain the hook portion of the wire 9 in collar 23.

In the modification shown in Fig. 4, the spring 28 urges collar 23 in seating engagement with recess 29 of bar 30 and consequently, it is not necessary that wire 9 shall be formed of spring steel although it may be formed of spring steel if desired. The device shown in Fig. 4 is actuated in the same manner as the device shown in Figs. 1 and 2. When the fish is gaffed, he exerts a downward pull on wire 9, releasing bar 30 which is forced to the left as shown in Fig. 4 to retain the fish in place or to hit or pierce the fish if he throws his body in alignment with the pointed end of bar 30. In resetting the device, bar 30 is pulled to the right against the tension of spring 15 until the recess 29 is in alignment with collar 23 which is forced into recess 29 by spring 28 to thereby hold the device in its extended position until the next fish is to be gaffed.

In the modification shown in Fig. 4, it will be noted that the free end portion of the gaff hook is provided with a barb 31 although the barb 31 may be omitted as shown in Fig. 1 or the gaff hook shown in Fig. 1 may be provided with a barb as shown in Fig. 4. Other modifications of our invention will of course be apparent to those skilled in the art, and it will be understood that we contemplate by the appended claims to cover any such modifications as fall within the true purpose and scope of our invention.

What is claimed is:

1. A gaff hook having a pointed portion, a loop portion and a rod portion which rod portion extends at a diverse inclination to the pointed portion of the hook, said rod portion being provided with a bore and a transverse opening, a bar slidable in the transverse opening in said rod portion which bar is provided with a recess adjacent its free end, resilient means associated with said bar for urging said bar in a direction toward the pointed portion of said hook, a wire having one end secured to said hook in proximity to the pointed portion of said hook, a loop portion arranged in spaced relation to the loop portion of the hook, and a free end portion extending into the bore of the rod portion of said hook which free end portion is provided with an abutment at its free end, resilient means arranged in said bore for urging the abutment on said wire into engagement with the recess in said bar when the bar is pulled in a direction away from the pointed end of said hook against the tension of said resilient means, and said wire being engageable by a fish being gaffed to pull said abutment out of the recess in said bar to release said bar when the fish is being gaffed to permit said bar to be moved under the influence of said resilient means to a position in which it retains the gaffed fish in place on said hook.

2. A gaff hook having a pointed portion, a loop portion, and a threaded rod portion provided with a bore, which rod portion extends at a diverse inclination to the pointed portion of said hook, a supporting sleeve threaded to said rod which terminates at a spaced distance from the free end of said rod, and said sleeve and rod portions being provided with transverse openings, a bar slidable in the transverse openings in said sleeve and rod portions which bar is provided with a recess adjacent its free end, resilient means associated with said bar for urging said bar in a direction toward the pointed portion of said hook, a wire having one end secured to said hook in proximity to the pointed portion of said hook, a loop portion arranged adjacent to but in spaced relation to the loop portion of said hook and a free end portion extending into the bore of said rod portion which free end portion is provided with a collar at its free end, resilient means arranged in said bore for urging said collar on said wire into engagement with the recess in said bar when said bar is pulled in a direction away from the pointed end of said hook against the tension of said resilient means, and said wire being engageable by a fish being gaffed to permit said bar to be moved under the influence of said resilient means to a position in which it retains the gaffed fish in place on said hook.

3. A gaff hook comprising a central loop portion having a pointed end integral with and extending from one end of the loop portion for impaling a fish and a rod integral with the other end of the loop portion which extends at a diverse inclination to the pointed portion and which provides a support for a handle and has a transverse opening therein, first means extending through the transverse opening in said rod which is movable away from the pointed end of the rod to a set position and which is movable toward the pointed end of the hook when released from its set position for retaining a fish gaffed on said hook in place, second means having a first portion secured adjacent to the pointed end of the gaff hook and a free portion engaging said first means to hold it in its set position when the first means is at a remote position from the pointed end of the hook, and said second means also having an intermediate looped portion which lies in the path of a fish being gaffed on said hook and which is movable by the fish being gaffed to release the free end portion of the second means from engagement with the first means to thereby release the first means from its set position, and resilient means associated with the first means for moving the first means across the loop portion of the hook for retaining the gaffed fish in place on said hook when the first means is released from its set position.

4. A gaff hook comprising a central loop portion having a pointed end integral with and extending from one end of the loop portion for impaling a fish and a rod integral with the other end of the loop portion which extends at a diverse inclination to the pointed portion and which provides a support at its free end for a handle and said rod portion being provided with a transverse opening, a bar extending through the transverse opening in said rod portion which bar is movable away from the pointed end of the rod to a set position and which is movable toward the pointed end of the hook when released from its set position for retaining a fish gaffed on said hook in place, means having a first portion secured adjacent to the pointed end of the gaff hook and a portion engaging said bar to hold it in its set position when said bar is at a remote position from the pointed end of the hook, and said means also having an intermediate looped portion which lies in the path of a fish being gaffed on said hook and which is movable by the fish being gaffed to release the free end of said means from engagement with said bar to thereby release the bar from its set position, and resilient means associated with said bar for moving the bar across the loop portion of the hook for retaining the gaffed fish in place on said hook when said bar is released from its set position.

5. A gaff hook comprising a central loop portion having a pointed end extending from one end of the loop portion for impaling a fish and a rod extending from the other end of the loop portion of said hook which is arranged at a diverse inclination to the pointed end and which provides a support for a handle and said rod being provided with a transverse opening and a longitudinally extending bore, a bar extending through the transverse opening in said rod which bar is provided with a free end portion, said bar being movable away from the pointed end of the rod to a set position and being movable toward the pointed end of the hook when released from its set position for retaining a fish gaffed on said hook in place, means having one end secured to the hook portion adjacent the pointed end of said hook and a free end portion arranged in the longitudinal bore in said rod for engaging a portion of said bar for holding the bar in its set position in which its free end is at a remote distance from the pointed end of said hook, and said means having a looped portion spaced inwardly from the loop portion of the hook which lies in the path of a fish being gaffed on said hook and which is movable by the fish being gaffed to release the free end portion of said means from engagement with said bar to thereby release said bar from its set position, and resilient means associated with said bar for moving the bar across the loop portion of said hook when the bar is released from its set position.

6. A gaff hook as defined in claim 5 in which the means secured adjacent the pointed end of the hook and having a loop portion spaced from the loop of the hook and a free end portion arranged in the longitudinal bore of the rod for engaging a portion of the bar, consists of a spring wire.

7. A gaff hook as defined in claim 5 in which the bar has a pointed end portion and a transverse opening arranged a short distance from its pointed end and in which the means having one end secured adjacent to the pointed end of the hook, a loop portion spaced inwardly from the loop of the hook, and a free end portion arranged in the longitudinal bore of the rod for engaging a portion of the bore, consists of a spring wire which is urged upwardly in the longitudinal bore of said rod by its spring tension and the free end of which extends through the transverse opening in said bore in the bar when the bar is pulled away from the pointed end of said hook to position its transverse opening in alignment with the longitudinally extending bore in said rod.

8. A gaff hook comprising a central loop portion having a pointed end extending from one end of the loop portion for impaling a fish and a rod extending at a diverse inclination to the pointed end of the hook, said rod being provided with a bore and a transverse opening, a sleeve surrounding and serving as a support for said rod and having a transverse opening therein in alignment with the transverse opening in said rod which sleeve terminates a short distance from the outer end of the rod to provide a space on said rod for receiving a handle for said hook, a bar extending through the transverse openings in said rod and sleeve which bar is movable toward the pointed end of said hook for retaining a fish gaffed on said hook in place, means having one end secured to the hook portion adjacent the pointed end of said hook, a loop portion spaced inwardly from the loop portion of the hook, and a free end portion arranged in the bore of said rod and engaging a portion of said bar for holding the free end portion of said bar in a position remote from the pointed end of said hook, and said means being movable by a fish being gaffed on said hook to release the transverse bar, and resilient means associated with said bar for moving it across the loop portion of the hook for retaining a gaffed fish in place when said bar is released.

9. A gaff hook as defined in claim 8 in which the rod is threaded, the sleeve in in threaded engagement with the rod, and the free end of the threaded rod extends beyond the sleeve, and a handle threaded to the free end of the rod.

10. A gaff hook as defined in claim 8 in which the bar has a pointed free end portion and a transverse opening adjacent its free end portion and in which the means having one end secured to the hook adjacent the pointed end of the hook, a loop portion spaced inwardly from the loop portion of the hook, and a free end portion arranged in the bore of the rod and engaging a portion of the bar for holding the free end portion of the bar in a position remote from the pointed end of the hook, consists of a spring wire which is movable through the transverse opening in the free end portion of the bar when the bar is moved to a position in which the transverse opening adjacent its free end is in alignment with the longitudinal bore in the rod portion of said hook.

ELMER E. BROWN.
ROBERT E. BROWN.

REFERENCES CITED

The following references are of record in the file of this patent:

UNITED STATES PATENTS

| Number | Name | Date |
|---|---|---|
| 365,568 | Betz | June 28, 1887 |
| 784,747 | Lobit | Mar. 14, 1905 |
| 2,155,913 | Thompson et al. | Apr. 25, 1939 |